(12) United States Patent  
Feldmann et al.

(10) Patent No.: US 7,796,619 B1  
(45) Date of Patent: Sep. 14, 2010

(54) SYSTEM AND METHOD FOR DERIVING TRAFFIC DEMANDS FOR A PACKET-SWITCHED NETWORK

(75) Inventors: Anja Feldmann, Saarbruecken (DE); Albert Gordon Greenberg, Summit, NJ (US); Carsten Lund, Berkeley Heights, NJ (US); Nicholas Reingold, Madison, NJ (US); Jennifer Lynn Rexford, Summit, NJ (US); Frederick D. True, Bloomsbury, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 650 days.

(21) Appl. No.: 11/235,491

(22) Filed: Sep. 26, 2005

Related U.S. Application Data (63) Continuation of application No. 09/876,383, filed on Jun. 7, 2001, now Pat. No. 7,027,448, which is a continuation of application No. 09/661,517, filed on Sep. 13, 2000, now abandoned.

(60) Provisional application No. 60/199,091, filed on Apr. 21, 2000.

(51) Int. Cl.  
*H04L 12/28* (2006.01)  
*H04L 12/56* (2006.01)  
*H04L 12/26* (2006.01)

(52) U.S. Cl. ........................ 370/401; 370/229; 370/235; 370/252

(58) Field of Classification Search ......... 370/252–258, 370/229, 235, 401  
See application file for complete search history.

(56) References Cited

U.S. PATENT DOCUMENTS

| | | | |
|---|---|---|---|
| 6,363,077 B1 * | 3/2002 | Wong et al. | 370/422 |
| 6,711,172 B1 * | 3/2004 | Li | 370/401 |
| 6,738,350 B1 * | 5/2004 | Gao et al. | 370/232 |
| 7,151,775 B1 * | 12/2006 | Renwick et al. | 370/400 |

OTHER PUBLICATIONS

Cisco Systems, NetFlow Services and Applications, 1999.*  
Cisco Systems Inc. NetFlow Services and Applications: White Paper, 1999.*

* cited by examiner

*Primary Examiner*—Ronald Abelson (57) ABSTRACT

The present invention is directed to a method and system for deriving traffic demands for a packet-switched network. A novel model of defining traffic demands as a volume of load originating from an ingress link and destined to a set of egress links enables support for traffic engineering and performance debugging of large operational packet-switched networks.

10 Claims, 6 Drawing Sheets

```
For each flow: (input, dest, start, finish, bytes)
    dest_prefix = longest_prefix_match(dest, dest_prefix_set);
    egress_set = reachability(dest_prefix);
    start_bin = [start/width] * width;
    finish_bin = [finish/width] * width;
    if (start_bin == finish_bin)
        volume[input, egress-set, start_bin] += bytes;
    else  /* Compute volume of traffic for each time_bin */
        byte_rate = bytes / (finish - start)
        volume[input, egress_set, start_bin] += byte_rate * (start_bin + width-start);
        for (time_bin = start_bin + width; time_bin < finish_bin; time_bin += width)
            volume[input, egress_set, time_bin) += byte_rate * width;
        volume[input, egress_set, finish_bin] += byte_rate * (finish - finish_bin);
Output for each aggregate: (input, egress_set, time_bin, volume)
```

FIG. 4

```
For each flow: (input, output, src, dest, start, finish, bytes)
    dest_prefix = longest_prefix_match(dest, dest_prefix_set);
    egress_set = reachability(dest_prefix);
    if (input.type == peer  /* Inbound or (ingress) transit flow */
        compute volume[input, ergess_set, input, output, time_bin] for each bin;
    else  /* Outbound or (egress) transit flow */
        src_prefix = longest_prefix_match(src, src_access_prefix_set);
        if (src has no match)
            ingress_set = sendability(src_prefix);
            compute volume[ingress_set, egress_set, input, output, time_bin] for each bin;
Output for each aggregate: (ingress_set, egress_set, input, output, time_bin, volume)
```

FIG. 5

```
For each aggregate: (ingress_set, egress_set, input, output, time_bin, volume)
    For each a in ingress_set
            route = Route(a, egress_set);
            if (route does not use input and output links)
                    remove a from ingress_set;
    if (ingress_set ≠ ∅)
            for each a in ingress_set
                    dvolume[a, egress_set, time_bin] += volume / size_of(ingress_set);
    else
            count as a miss;
Output for each demand: (a, egress_set, time_bin, dvolume)
```

SYSTEM AND METHOD FOR DERIVING TRAFFIC DEMANDS FOR A PACKET-SWITCHED NETWORK

CROSS REFERENCE TO RELATED APPLICATIONS

This application is a continuation of prior application Ser. No. 09/876,383 filed Jun. 7, 2001 now U.S. Pat. No. 7,027,448, which is a continuation of prior application Ser. No. 09/661,517, filed on Sep. 13, 2000 now abandoned, which claims the benefit of U.S. Provisional Application No. 60/199,091, filed on Apr. 21, 2000, all of which are incorporated herein by reference.

FIELD OF THE INVENTION

The present invention relates generally to packet-switched networks. More particularly, the present invention relates to traffic engineering and deriving traffic demands in a packet-switched network.

BACKGROUND OF THE INVENTION

The Internet is divided into a collection of autonomous systems, each autonomous system ("AS") managed by an Internet Service Provider ("ISP") who operates a backbone network that connects to customers and other service providers. Large ISPs have few software systems and tools to support traffic measurement and network modeling, the underpinnings of effective traffic engineering. Seemingly simple questions about topology, traffic, and routing are surprisingly hard to answer in today's packet-switched networks. A tremendous amount of work has gone into developing mechanisms and protocols for controlling traffic. By comparison, little work has gone to support traffic measurement and network modeling in operational networks. Unfortunately, unless control mechanisms are driven by the appropriate measurements and understanding from well-tested models, the benefit of the controls will be limited.

Accordingly, there is a need for new systems and methods of measuring and modeling a packet-switched network that permit effective traffic engineering.

SUMMARY OF THE INVENTION

The present invention is directed to a method and system for deriving traffic demands for a packet-switched network. A novel model of defining traffic demands as a volume of load originating from an ingress link and destined to a set of egress links enables support for traffic engineering and performance debugging of large operational packet-switched networks. In accordance with an embodiment of the present invention, flow-level measurements are collected at ingress links with reachability information about egress links. The methodology is capable of capturing and predicting how routing can affect inter-domain traffic, i.e. the traffic demands between individual domains. The methodology can be modified to cope with situations where practical considerations limit the amount and quality of the necessary data. For example, inter-domain traffic demands may be derived using measurements collected from a smaller number of edge links, namely the peering links connecting to neighboring networks.

These and other advantages of the invention will be apparent to those of ordinary skill in the art by reference to the following detailed description and the accompanying drawings.

DETAILED DESCRIPTION

Figure 1:
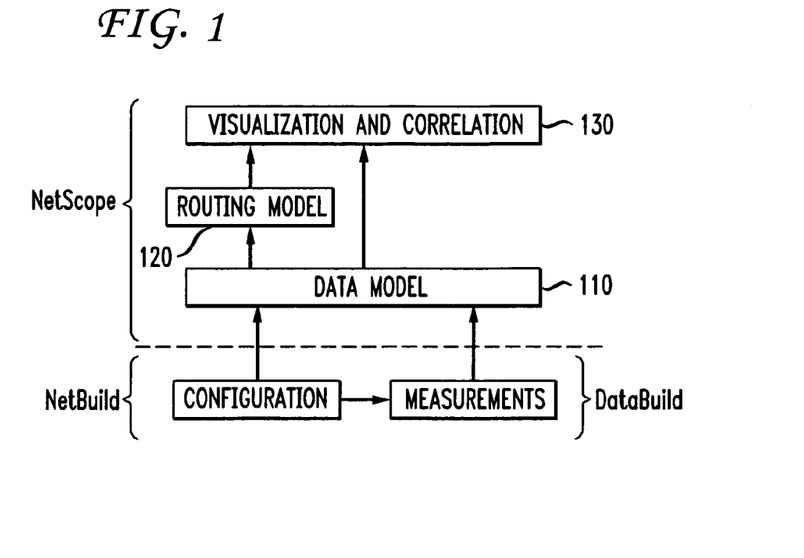
FIG. 1 sets forth an abstract software architecture, in accordance with a preferred embodiment of the present invention.

FIG. 1 sets forth an abstract architecture of an advanced traffic engineering software tool configured in accordance with a preferred embodiment of the present invention. The software is advantageously divided into separate modules, each of which can be implemented in any of a number of suitable programming languages capable of execution on a digital computer, such as C, Tcl/Tk, or Pen. An advantageous manner of program code development is to use a software package, such as "Obj2C", to convert data object descriptions into generated programming code for standard manipulation of the data objects and a prototype graphical user interface.

As is further described in the following sections below, the software entitled by the inventors "NetScope" comprises three modules: a data model module 110 responsible for construction and manipulation of the network data model, a muting model module 120 responsible for construction and manipulation of the network muting model, and a visualization module 130 responsible for visualization, display, and correlation of multiple views of the network and usage information. The data model module 110 receives, as input, network topology information and network traffic demand information in order to properly populate the network data model. Netscope is advantageously separated and modularized (as shown abstractly by the dotted line) from the sources of the network topology and traffic demand information. This architecture permits the parts above the dotted line to be unaware of changes to modules below the dotted line. The decomposition into modules and the design of the underlying modules localize possible changes to the network, allowing for the simple evolution and extension of the software.

One way of obtaining the configuration and traffic data is shown in FIG. 1: namely, two other modules 140 and 150 entitled by the inventors "NetBuild" and "DataBuild" respectively. The modules 140 and 150 provide input to the data model module 110; these two modules take as input the raw data regarding network configuration and measurement, and provide as output higher level abstractions and information for the data model. This is highly advantageous in that an operational network is under continuous change. It should be noted that the inputs to the data model module 110 need not come from an operational network. For example, configuration data can come from an operational network or from a proposed/projected topology design. Likewise, the traffic demands could come from measurements of the operational network, from estimates or projections, or from customer subscriptions (e.g., for a virtual leased line service). The particular source of the network configuration and traffic demand information for the traffic engineering software is not a limitation of the present invention.

1. Data Model

The present invention advantageously combines diverse network configuration information with diverse network measurements in a joint data model. The following two subsections describe (a) a preferred network topology model as well as practical ways of obtaining information to populate the topology model; and (b) a preferred traffic demand model and various ways of obtaining network traffic measurements to populate the traffic matrix.

A. Topology

Traffic engineering requires a network-wide view of the underlying layer-three and layer-two topology. In accordance with a preferred embodiment of the present invention, a topology model is presented that advantageously captures backbone connectivity, connections to customers and peers, link capacity, and OSPF configuration. A preferred data model includes data objects for network nodes and links in both a "pure" IP router layer (i.e. routers and layer three links) and in a physical transport layer (i.e. devices and trunks). It is advantageous to include layer two devices and trunks in the data model because some networking technologies, such as FDDI and ATM, introduce an intermediate switching fabric at layer two, e.g. multiple layer three links may share a single trunk, or a single layer-three link may correspond to a permanent virtual circuit ("PVC") that traverses one or more ATM switches. This introduces layers of connectivity and capacity, which has implications for traffic engineering and reliability.

Figure 2:
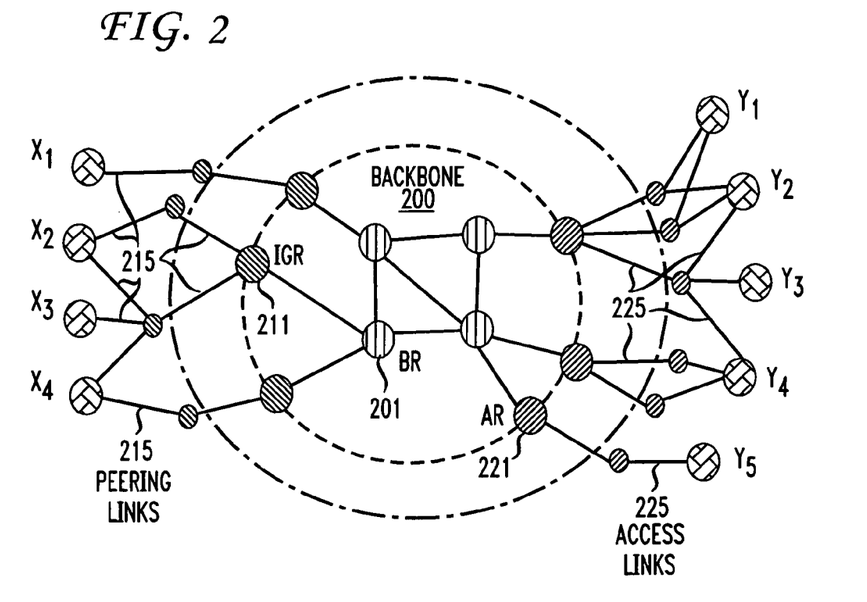
FIG. 2 sets forth a diagram of an IP backbone network.

FIG. 2 sets forth a diagram of an IP backbone network 200 which highlights the different elements of the data model in the main router layer. IP routers and bi-directional layer-three links are represented as nodes and edges in FIG. 2. In a typical IP backbone network, each router terminates a mixture of "access", "peering", and "backbone" links. An access link 225 connects directly to customers, e.g. to a modem bank for dial-up users, a web-hosting complex, or a particular business or university campus. As shown in FIG. 2, some customers can have two or more access links for higher capacity, load balancing or fault tolerance (such customers are referred to in the art as "multi-homed customers"). Peering links 215 connect the backbone network to neighboring service providers, e.g. to a public Internet exchange point or directly to a private peer or transit provider. A typical ISP has multiple peering links to each neighboring provider, typically in different geographic locations. Backbone links connect routers inside the ISP backbone. The network in FIG. 2 has been simplified in that all access links terminate at Access Routers ("ARs" e.g. 221) and all peering links terminate at Internet Gateway Routers ("IGRs" e.g. 211), and all remaining routers are characterized as Backbone Routers ("BRs" e.g. 201) that only terminate backbone links. In fact, in an operational network, this split in functionality simplifies the requirements for each router: ARs provide high port density to connect to a large number of customers with various access speeds and technologies; BRs provide high packet-forwarding performance; IGRs can isolate peer traffic and simplify management of inter-domain muting policies. (The meaning of the groupings $X_1, X_2, \ldots$ and $Y_1, Y_2, \ldots$ will be explained in the section below on traffic demand).

Each router is represented by a data object with attributes including the muter name, the loopback IP address of the muter, the type of the router (e.g. AR, BR, IGR), and the geographic location of the router in terms of city and latitude/longitude. In addition, each router includes information about which links it originates. For example, a router data object can have the following parameters:

| | |
|---|---|
| routerName (string) | Any uniquely identifying string. |
| type (string) | The type of router: e.g. BR = Backbone router; AR Access router; IGR = Internet Gateway router; CR = Customer router; and PR = Peering router. |
| count (int) | useful router index, e.g. the third access router at Chicago will have a count equal to 3. |
| complex | An identifier for a data object representing a central office housing the instant router. |
| IP (string) | The loopback interface of the router. |
| dlatitude (double) | The displacement from the complex location for this router. |
| dlongitude (double) | The displacement from the complex location for this router. |
| pnode | An identifier for a data object representing the physical node that corresponds to this router. |
| networks | A sequence of IP masks. The IP networks that are directly connected to this router. Can be empty. |

Each layer-three link is represented by a data object with attributes containing general information about the router originating the link, the name of the router card, the IP address of the interface, whether the link is shutdown or not, a textual description of its purpose, its capacity, and its OSPF weight. Some attributes can be associated with both directions of a link. For example, each bidirectional link can be classified as an access, backbone, or peering link. Backbone links also belong to a particular OSPF area, which must be the same for both unidirectional links. Peering links are associated with a particular BGP peer, identified by its AS number and annotated by the IP address of the BGP peer in the remote domain.

For example, a link data object can model a router interface and have the following parameters. Note that only interfaces that terminate at another router are included, e.g. interfaces that correspond to a PVC but not the interfaces that terminate on an ATM switch:

| | |
|---|---|
| x | An identifier corresponding to the router data object with this interface. |
| CardName (string) | Name of the interface. |
| y | An identifier corresponding to the router data object where this link terminates. |
| linkid (int) | This gives an identifier on the full-duplex link. This can be used to find the link in the opposite direction |
| type (string) | The type of the link, e.g. BACKBONE, INTERNAL, or ACCESS. |
| IP (string) | The IP address of the interface. |
| Capacity (int) | The bit rate of the interface m Kbytes. Note that for some links, e.g. PVCs, this number makes not too much sense since the bandwidth is shared between multiple interfaces. |
| OSPF (int) | The OSPF weight of the interface. |
| OSPFarea | The OSPE area of the interface. |
| Status (int) | Status of the interface. |
| Desc (string) | The description field from the router configuration file. |
| plinks | A sequence of references to physical link data objects. This is a list of the physical links that this link lays out to. |

Each device or physical node is represented by a data object that has parameters identifying what type of device it is, e.g. a router or an ATM switch, where the node is located, and a list of trunks that originate at the device. Trunks describe the connectivity between routers and devices, and include the information about which links traverse a given trunk. For example, each physical node ("pnode") can have the following parameters:

| | |
|---|---|
| name (string) | An identifying string for the physical node. |
| complex | An identifier for a data object representing a central office housing the physical node. |
| dlatitude (double) | The displacement from the complex location for this pnode. |
| dlongitude (double) | The displacement from the complex location for this pnode. |
| type (string) | The type of pnode, e.g. router or ATM. |

And each physical link ("plink") can have the following parameters:

| | |
|---|---|
| x | An identifier corresponding to the pnode data object where this link originates. |
| CardName (string) | Any string which with x uniquely identifies the plink. |
| y | An identifier corresponding to the pnode data object where this link terminates. |
| trunkid (int) | This gives an identifier on the trunk. |
| type (string) | |
| capacity (int) | |
| Desc (string) | |

The above model is very general and its objects can be populated in a number of different ways, such as modifying an existing data model, constructing an artificial network, or extracting the information from the real network.

Extracting Network Topology. Unfortunately, there is no single place within a typical IP network that would allow extraction of the information necessary to populate the above preferred model. Rather, the information is distributed among many routers in the Internet. Even within an ISP network, information is decentralized. For example, even OSPF link state information may be insufficient to extract the topology of an IP backbone, especially since OSPF areas hide information. In addition, OSPF link state certainly does not contain information about access links and peering links.

End-to-end mechanisms such as "ping" and "traceroute" can be used for basic network topology discovery—but are cumbersome and provide only basic connectivity information. SNMP queries or traps can also be utilized, but require active querying of all network elements. See, e.g., "A Simple Network Management Protocol (SNMP)," IETF RFC 1157, Network Working Group, May 1990.

An alternative approach is to extract the information from the router configuration files for the operational network. This has the advantage of capitalizing on all the additional information contained in the router configuration files, including customer and peer information. A perhaps less obvious advantage is that the router configuration files are routinely logged for backup purposes and easily accessible without accessing the live operational network. The disadvantages are that the information is not updated continuously and that the configuration files reflect the state of the network absent failures. Nevertheless, router or link failures or physically disconnected links can be taken account of by a separate data feed. Populating the data objects in the data model using the router configuration files is made much easier by using a packet-switched network configuration debugger and database, as described in utility patent application, "Netdb: IP Network Configuration Debugger/Database," U.S. Patent and Trademark Office Application Ser. No. 60/160,446.

Traffic engineering requires information about the IP addresses reachable from each access and peering link. Readability information can be obtained from a number of different sources in the network, e.g., as described below, forwarding tables, BGP tables in general, and route reflector BGP tables in particular. The inventors have found it advantageous to rely on the forwarding tables, although the same information could come from other sources as well, such as the BGP tables, configuration files, etc.

The packet-forwarding tables at each of the Access Routers may be used to extract customer IP addresses, when not listed in a router configuration file. The forwarding table is, in a way, the ultimate authority for how the backbone forwards packets to a set of customer IP addresses. The forwarding table can be logged periodically (e.g., with the IOS command "show ip cef") and post-processed (e.g. using a Perl script) to extract the set of network addresses associated with each access link. The table includes three main fields—the network address, the next-hop IP address (when known), and the card name of the outgoing link. The network address can be associated with the appropriate access link based on the card name, which is part of the topology model that is extracted from the muter configuration files.

The BGP routing table may also be processed to determine which peering links are used to reach each external IP address. An ISP has limited control over the external IP addresses that connect to the Internet through other service providers. Routing of traffic from these external addresses depends on the policies other service providers employ for selecting paths and propagating router advertisements. Routing of traffic from customers to these external addresses depends on the advertisements the ISP receives and how they are processed. Applying local policy to the route advertisements results in a BGP muting table that indicates the chosen AS path for each external network address. See, e.g., "A Border Gateway Protocol (BGP-4)," IETF RFC 1771, Network Working Group, March 1995. Based on this information, the set of peering links that can be used to reach each external network address can be determined. Similar to the customer addresses associated with each access link, each peering link can be associated with a set of external network addresses (it should be noted that, in a preferred embodiment of the present invention, this information is used to study muting of traffic destined for that network address and not how traffic form that network address enters the network).

The BGP muting table from a single route reflector in the backbone can also be utilized to determine the set of peering links associated with each external network address (e.g., using the IOS command "show ip bgp"). The ARs and BRs receive advertisements of the AS paths selected by the IGRs. Given the potentially significant fluctuations in BGP routing information, it is advantageous to incorporate a continuous feed of BGP information into the model. Each entry in the BGP muting table corresponds to a single IGR that can be used to reach a particular network address. An entry in the table indicates the network address, the loopback address of the associated IGR, and the AS path. A simple Perl script may be used to process all of the entries in the BGP table to determine the set of network addresses associated with each peering link.

B. Traffic Demand

Effective traffic engineering requires not just a view of the topology but also an accurate estimate of the offered load between various points in the backbone. How should traffic demands be modeled and inferred from operational measurements? At one extreme, IP traffic could be represented at the level of individual source-destination pairs, possibly aggregating sources and destinations to the network address or AS level. Representing all hosts or network addresses, however, would result in an overly large traffic matrix, virtually impossible to populate since no single ISP is likely to see all of the traffic to and from each network address. Alternatively, IP traffic demands might be aggregated to point-to-point demands between edge links or routers in the ISP backbone. This approach, however, has fundamental difficulties in dealing with interdomain traffic (traffic whose ultimate destination belongs to another domain). Inter-domain traffic, which constitutes a large fraction of traffic in operational IP networks today, may exit the ISP backbone from any of a set of egress links, determined by interdomain muting policies. Modeling interdomain traffic as point-to-point would couple the demand model to internal muting configuration, making it highly problematic to predict how changing internal muting configuration would influence network load.

In accordance with an aspect of the present invention, an alternative model is described which effectively handles interdomain traffic and advantageously is invariant to changes in the internal routing configuration. The preferred model of traffic demand consists of an ingress link, a set of egress links, and a volume of load. For example, the traffic demands between routers can be represented as data objects with the following attributes:

| | |
|---|---|
| x | An identifier corresponding to the source router data object. |
| y | A sequence of router data objects representing the set of potential destination routers. The string x, y must uniquely identify this demand. |
| Kbytes (double) | The amount of data for this demand. |
| packets (double) | Alternative measurement of demand. Does not need to be used. |
| arrivals (double) | Alternative measurement of demand. Does not need to be used. |

The path traveled by an IP packet depends on the interplay between interdomain muting protocols (e.g. BGP) and intra-domain muting protocols (e.g. OSPF, IS-IS, or MPLS). The ISP network lies in the middle of the Internet and may not have any direct connection to the sender or the receiver of any particular flow of packets. As such, a particular destination prefix may be reachable via multiple egress links from the ISP: e.g. a multi-homed customer may receive traffic on multiple links that connect to different points in the backbone or an ISP may have multiple links connecting to a neighboring provider. The ultimate decision of which route to use depends on the BGP route-selection process. By associating each traffic demand with a set of egress links that could carry the traffic, the set basically represents the outcome of the early stages of the BGP route selection process before the consideration of the intradomain protocol.

The set of peer links can be represented by a logical node $X_i$, and, similarly, a set of access links can be represented by a logical node $Y_j$, as illustrated in FIG. 2. The matching process can draw on the list of customer network addresses from the Access Router forwarding tables and the external network addresses from the BGP table. The source and destination addresses can be aggregated by performing a longest-prefix match on these lists of network addresses. The network addresses can then be used to associate traffic measurements with the appropriate sets of access or peering links.

Traffic Measurement. It is advantageous to collect traffic measurements at all ingress links to compute traffic demands and identify the traffic as it enters the ISP backbone. Collecting packet-level traces at each ingress link, however, would be prohibitively expensive. Instead, flow-level statistics can be collected by each ingress router, a "flow" being defined in the art as a set of packets that match in the key IP and TCP/UDP header fields (such as the source and destination address, and port numbers) and arrive on the same ingress link. For example, routers manufactured by Cisco have a Netflow™ feature that, when enabled, permits the router to keep track of the amount of traffic in each active flow. The router can summarize the traffic statistics on a regular basis, either after the flow has become inactive or after an extended period of activity. Sampling the flow measurements may also be performed to reduce the total amount of data.

Figure 3:
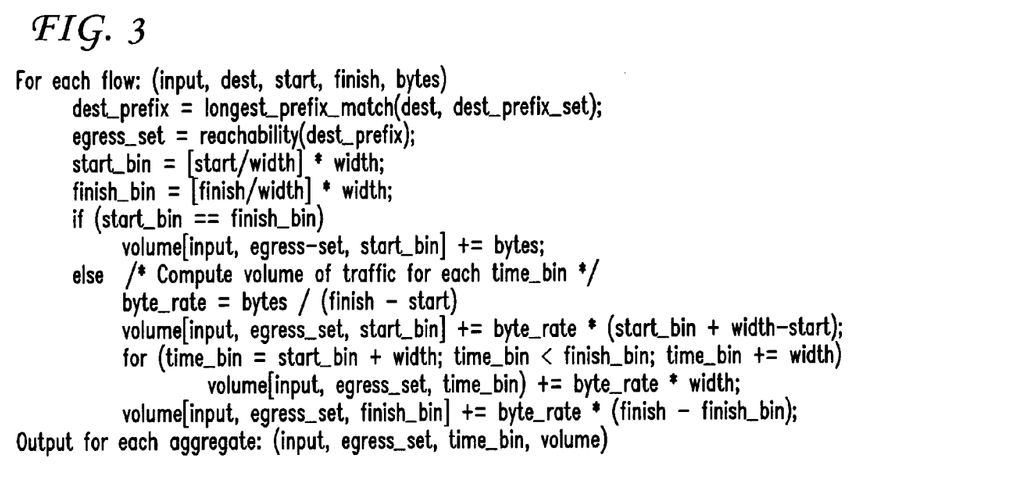
FIG. 3 and FIG. 4 set forth pseudo-code for computing traffic flows, in accordance with a preferred embodiment of the present invention.

FIG. 3 sets forth an algorithm, in pseudo-code, for computing the traffic demands upon receiving a flow record with the following information: an input link and a destination IP address dest to identify the end-points of the demand, the start and finish times of the flow, and the total number of bytes in the flow. Additional information in the measurement records, such as TCP/UDP port numbers or type-of-service bits, could be used to compute separate traffic demands for each quality-of-service class or application. Aggregating the flow-level measurements into traffic demands requires information about the destination prefixes associated with each egress link. For example, the aggregation process draws on a list, dest_pref_ix set, of network addresses, each consisting of an IP address and mask length. Each destination prefix, dest_pref_ix, can be associated with a set of egress links, reachability (dest_prefix). For example, in an operational network, these prefixes could be determined from the entries in the forwarding tables at routers that terminate egress links. (Note that the forwarding table at a router connected to an ingress link could have a different set of prefixes, particularly if the IP routing protocols have been configured to aggregate subnet address). In particular, each forwarding table entry identifies the next-hop link(s) for a particular prefix. This enables identification of the prefixes associated with each egress link.

As reflected in FIG. 3, computing traffic demands across a collection of flows at different routers introduces a number of timing challenges. The flow records do not capture the timing of the individual packets within a flow. Nevertheless, traffic engineering occurs on a time scale larger than most flow durations, thus permitting time to be divided into consecutive width-second bins in which most flows will start and finish. When a flow spans multiple bins, the traffic can be subdivided in proportion to the fraction of time spent in each time period.

An alternative to measuring traffic demand at each ingress link is to collect measurements at a much smaller number of edge links, e.g. the links connecting the ISP to neighboring providers. This is advantageous in that it frees access routers, which often may not be capable of collecting fine-grain measurements, from the additional measurement overhead. In contrast, the small number of high-end routers that connect neighboring providers typically have a much smaller number of links, with substantial functionality (including measurement functions) implemented directly on the interface cards that connect each link to the router. By monitoring both the ingress and egress links at these locations, it is possible to capture a large fraction of the traffic in the ISP backbone—but this introduces new complications for measuring traffic.

Figure 4:
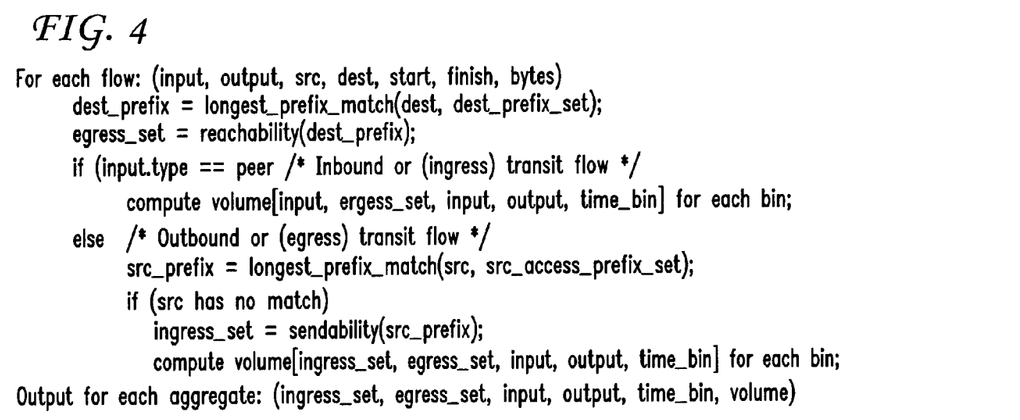

Traffic flows in the IP backbone can be characterized as "inbound" traffic (i.e. packets travelling from a peering link to an access links), "transit" traffic (travelling between two peering links), "outbound" traffic (travelling from an access link to a peering link) and "internal" traffic (travelling between two access links). The characterization of the traffic flow will affect how the flow should be handled. As further described below, the flow can be classified at a peering link based on the input and output links as follows:

| Input | Output | Classification | Action |
|---|---|---|---|
| Peer | Backbone | Inbound or multi-hop transit | Point-to-multipoint demand |
| Peer | Peer | Single-hop transit | Point-to-multipoint demand |
| Backbone | Backbone | Backbone traffic | Omit flow |
| Backbone | Peer | Outbound or multi-hop transit | Identify possible ingress link(s). Omit flow or compute demand | a. Internal Traffic. It should be noted that monitoring the peering links does not capture internal traffic sent from one access link to another. For customer traffic to and from particularly important access links (e.g., to the ISP's e-mail, Web, and DNS services), this can be addressed by enabling flow-level measurements—effectively treating these connections like peering links.

b. Inbound Traffic. For inbound flows, traveling from a peering link to a backbone link, the above measurement methodology can be directly applied, since flow-level measurements are available from the ingress link. FIG. 4 sets forth the process of aggregating the flow records, skipping the details from FIG. 3 regarding dividing the bytes of the flow across multiple time_bins.

c. Transit Traffic. Transit traffic falls into two categories—single-hop and multiple-hop. A single-hop flow enters and exits the ISP backbone at the same edge router, without traversing any backbone links: in this case, the flow can be measured once, at this router. A multi-hop flow enters at one router, traverses one or more backbone links, and exits at another router. Measuring both ingress and egress traffic at the peering links, thus, results in duplicate measurements of transit traffic that travels from one provider to another, special attention is required to avoid double-counting this traffic. The best place to capture a transit flow is at its ingress link, where the above methodology can be applied. To avoid double-counting the flow, the flow records generated by multi-hop transit flows as they leave the network need to be discarded. This requires distinguishing outbound flows (introduced by an access link) from transit flows (introduced by a peering link). For a flow leaving the ISP network, the algorithm in FIG. 4 attempts to match the source IP address with a customer prefix at an access link. For transit flows, this matching process would fail, and the associated flow record would be properly excluded.

d. Outbound Traffic. Computing the outbound traffic demands that travel from across links to peering links becomes more difficult, since flow-level measurements are not available at the ingress links. The flow measurements provide two pieces of information that help to infer the access link responsible for the outbound traffic (1) the source IP address and (2) the input/output links that observed the flow at the egress router. The source IP address indicates which customer generated the traffic (assuming the sender has not spoofed the source address). The source IP address should be matched with a customer prefix which, in turn, should be matched with a set of possible access links that could have generated the traffic. The pseudocode in FIG. 4 draws on a list, src_access_prefix_set, of the network addresses introducing traffic at access links. Each source prefix, src_prefix, can be associated with a set of ingress links, sendability (src_prefix). It should be noted that the muting forwarding tables are not sufficient for identifying the source addresses that might generate traffic on an access link. This is because Internet routing is not symmetric: traffic to and from a customer does not necessarily leave or enter the backbone on the same link. Fortunately, an ISP typically knows the IP addresses of its directly-connected customers, and, in fact, may assign IP prefixes from a larger address block belonging to the ISP. Packet filters are often used by ISPs to remove traffic with bogus source IP addresses, and, these packet filters are specified in the router's configuration file which may be accessed and parsed to determine which source prefixes to associate with each access link. From this information it can be determined the set of access links associated with each source prefix. (Where customers connect to other service providers or have downstream customers of their own, it may be preferable to perform flow-level measurements at the ingress links rather than depending on knowing the set of links where these sources could enter the ISP backbone).

Figure 5:
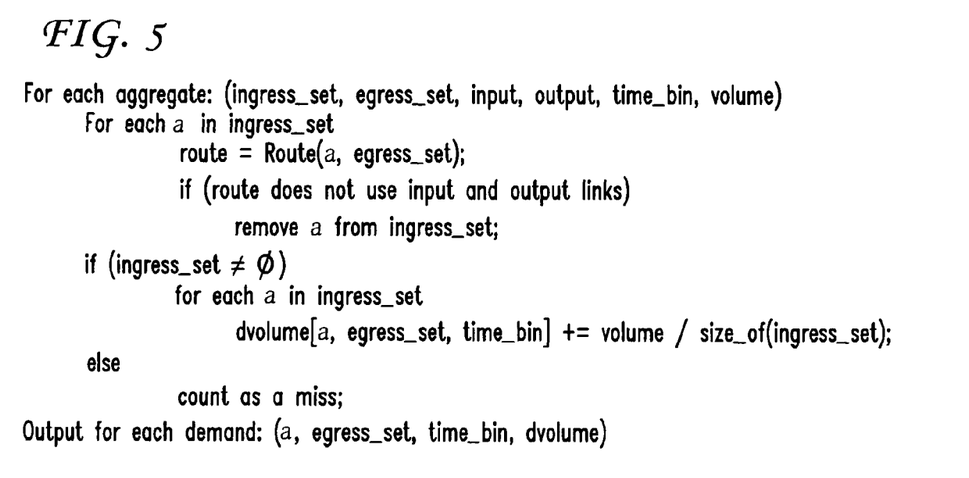
FIG. 5 sets forth pseudo-code for a disambiguation process, in accordance with a preferred embodiment of the present invention.

Information about the input and output links that measured the flow should be maintained, as this information is useful to help infer which of the access links could have generated the traffic. The algorithm in FIG. 4 results in a point-to-multipoint demand for inbound and transit flows. Each outbound flow, however, is associated with a set of ingress links, resulting in a multipoint-to-multipoint aggregate. Computing point-to-multipoint demands for outbound traffic requires an additional step to determine which access link initiated the traffic. FIG. 5 sets forth a "disambiguation" process which attempts to determine whether an outbound flow could have entered the network at a given ingress link based on knowledge of the backbone topology and intradomain routing configuration at the time the flow was measured. Information on the possible paths from each ingress link to each egress link is obtained from a muting model that is further described below in Section 2. For a given ingress link and set of egress links, it is determined on which egress link the flow would exit the network. If this was not the egress link where the flow was observed, then this ingress link can be eliminated from consideration. Knowing the path(s) from the ingress link to the egress link provides additional information: where the path of the flow from the ingress link does not include both of the links that observed the flow (i.e. the input backbone link and the output peering link), the ingress link should again be excluded from consideration. The process should be repeated for each of the possible ingress links, as shown in FIG. 5. The process has three possible outcomes. First, a single ingress link could have generated the traffic, resulting in the ideal situation of a single point-to-multipoint demand. Second, more than one of the candidate ingress links could have generated the traffic, in which case the disambiguation process generates multiple demands, each with an equal fraction of the traffic. Third, if none of the candidate ingress links could have generated the traffic, the disambiguation process has failed and the flow record is discarded. This provides a useful consistency check on the initial processing of the flow-level data.

2. Routing Model

A feature of the preferred embodiment of the present invention is that it combines the network model and the traffic measurements with an accurate model of path selection. Specifically, a routing module determines the path(s) chosen by the relevant muting protocol for each traffic demand, and the load imparted on each link as the traffic flows through the network. The routing module captures the selection of shortest paths to/from multi-homed customers and peers, the splitting of traffic across multiple shortest-path routes, and the multiplexing of layer-three links over layer-two trunks. These capabilities allow a user to explore the impact of changes in the traffic demands or in the underlying network topology.

There are a variety of routing protocols that may be utilized with the present invention, e.g., OSPF, IS-IS, etc. For example, the OSPF protocol defines how routers within an area exchange link-state information and compute shortest paths based on the sum of the link weights. See "OSPF Version 2", IETF RFC 2328, Network Working Group, April 1998. The link weights are static and are typically configured based on the link capacity, physical distance, and some notion of the expected traffic load. The chosen paths do not change unless a link or router failure occurs, or the OSPF parameters are reconfigured. These are rare events, particularly for the backbone links that participate in the routing protocol. As such, the routing module can consider a single instance of the network topology and OSPF configuration and need not simulate the details of the OSPF protocol, such as the flooding of link-state advertisements or the exchange of "hello" messages. The muting module can be verified by comparing the resulting paths with the router forwarding tables or traceroute experiments on an operational network. Performing the path selection computation inside the tool, rather than using the forwarding tables or traceroute results directly, facilitates experimentation with alternate OSPF configurations and different topologies.

When all of the backbone links reside in a single OSPF area, path selection simply involves computing the shortest paths between each pair of routers, based on the link weights. In a hierarchical network, traffic between two routers in the same area follows a shortest path within the area, even if the network has a shorter path that involves links in other areas. When traffic must travel between routers in different areas, the path depends on how much information each area has about its neighbors. The muting module can assume that the network does not summarize routing information at area boundaries. In the absence of route summarization, each border router reports the cost of the shortest path(s) to each of the other routers in the area, and the traffic between routers in different areas simply follows a shortest path without regard to the area boundaries. The routes can be computed using, for example, Dijkstra's shortest-path-first algorithm, which is well-known in the art. To limit the computational overheads, an implementation of the muting module can operate on a reduced network graph that collapses equivalent edges and nodes, and avoids recomputing distances and paths by caching intermediate results.

Path selection becomes more complex when there are multiple shortest paths between a pair of routers. Such ties arise very naturally when the network topology has parallel links between adjacent routers for additional capacity. Ties also surface when many of the links in the network have similar weights. This is sometimes done intentionally to increase the effective capacity between two endpoints. The presence of multiple shortest paths allows for load-balancing of the traffic between the two endpoints. This is achieved by allowing the IP forwarding table to have multiple outgoing links associated with a single entry. Rather than alternating between these links at the packet level, routers typically attempt to forward packets for the same source-destination pair along a single path; this reduces the likelihood that packets from the same TCP connection arrive out-of-order at the receiver. Load-balancing is typically achieved by performing a hash function on the source and destination IP addresses of each packet. The value of the hash function determines which outgoing link should carry the packet.

Figure 6:
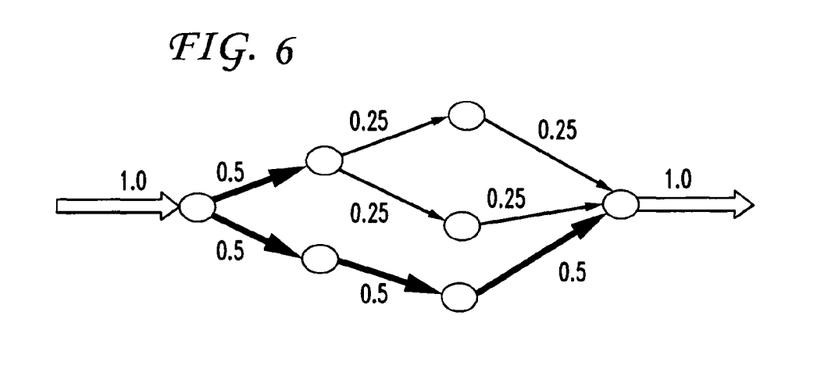
FIG. 6 set forth a diagram illustrating muting traffic division, in accordance with a preferred embodiment of the present invention.
Figure 7:
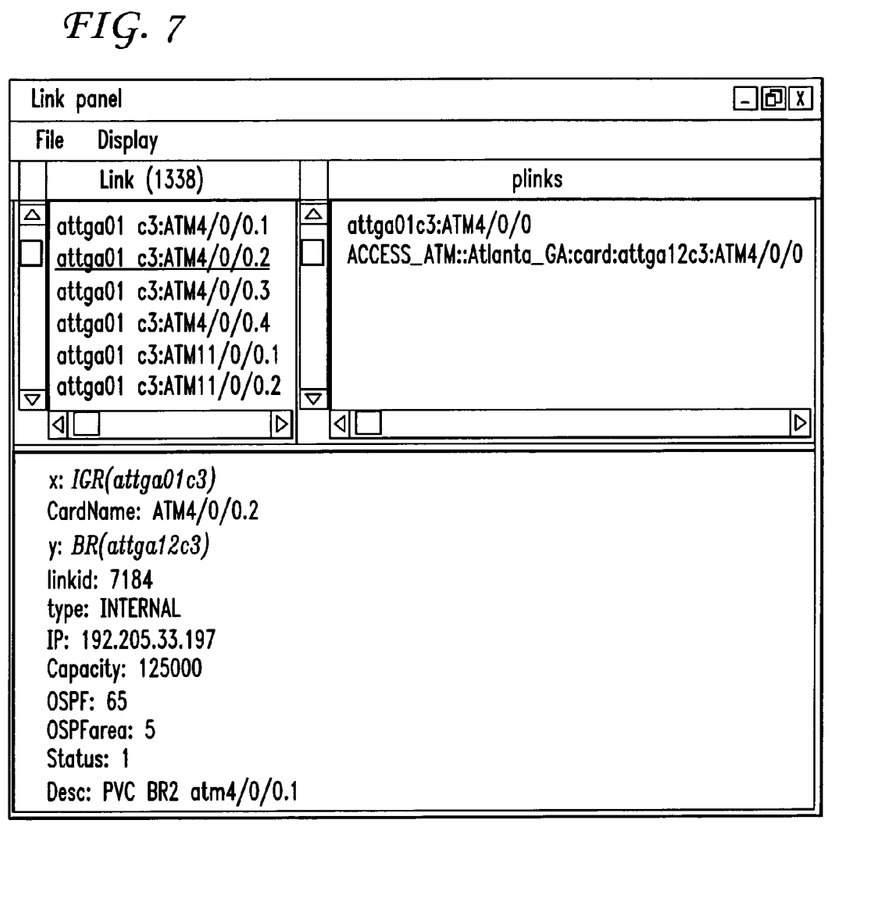
FIG. 7 through FIG. 11 set forth examples of graphical user interfaces for visualization of the network, in accordance with a preferred embodiment of the present invention.
Figure 8:
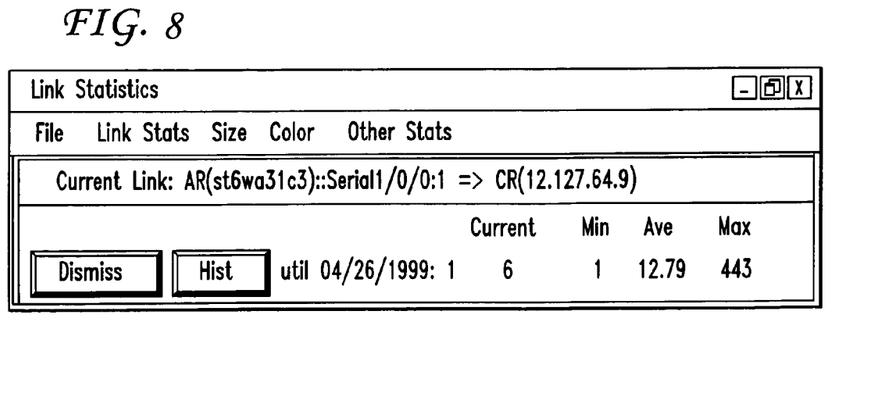

The details of the "tie-breaking" function can be modeled in the routing module. This, however, significantly complicates the path selection computation and would require computing traffic demands at a significantly finer level of granularity. In addition, the details of the hashing function, and how the outputs of the has function map to particular outgoing links are not specified by the OSPF protocol and, as such, depend on the vender's implementation. Fortunately, these details are not important. The hash function is designed to support an even splitting of the traffic across the multiple outgoing links, especially for backbone links that carry a diverse mixture of traffic with different source and destination addresses. As such, the routing module advantageously splits traffic evenly cross each of the outgoing links along a shortest path. For example, with regard to FIG. 6, if a router has two outgoing links on shortest paths, each link would carry 50% of the traffic. The division of traffic is recursive, with the downstream routers dividing the traffic across each of their outgoing links, as set forth in FIG. 6. For a more conservative estimate of the load on each link, the routing module could assume that each outgoing link carries a little extra more than its fair share of the traffic by applying a multiplicative factor.

Using the traffic demands described in the previous section, the routing module can operate on a set of demands, each traveling from one peering or access link to a set of access or peering links. The module computes the set of shortest-path routes based on the topology and the OSPF configuration, and determines how the demand splits across the multiple paths. Repeating this process for each demand results in an estimate of the load imparted on each link. Then, the routing module determines the load on each trunk (layer-two link) by summing across the associated layer three links. The generality of the routing model facilitates experiments with alternate topologies and OSPF configurations, as illustrated in the next section. It also supports experimentation with the BGP policies for outbound traffic, by changing the sets of peering links associated with external network addresses.

3. Visualization

A graphical user interface, such as the one set forth in FIGS. 7 through 11, can be used to provide an efficient visualization environment with many ways to explore the data in the data model. As set forth above, each router and link is modeled with a data object FIG. 7 sets forth an example of an information panel which displays attributes for objects of a given type. The information panel in FIG. 7 permits a user to quickly scroll through a list of links and see the corresponding attributes to the selected link in the bottom part of the panel, along with corresponding physical links in the right hand box in the panel.

It is useful to permit the data model to associate statistical information with objects. Each statistic need be no more than simply a value for each object of some type. For example, a link utilization statistic, which is a percentage associated with each link, can be calculated and displayed as set forth in FIG. 8. There should be no restriction on how many statistics can be associated with an object type. Thus, link utilization statistics can be stored for periods of time and can be used to create histograms, scatter plots, tables, etc. The color or size of the object when displayed can be utilized to reflect the statistic, thereby providing a visual representation of the statistic, e.g. coloring links with high utilization as thick and red.

Figure 9:
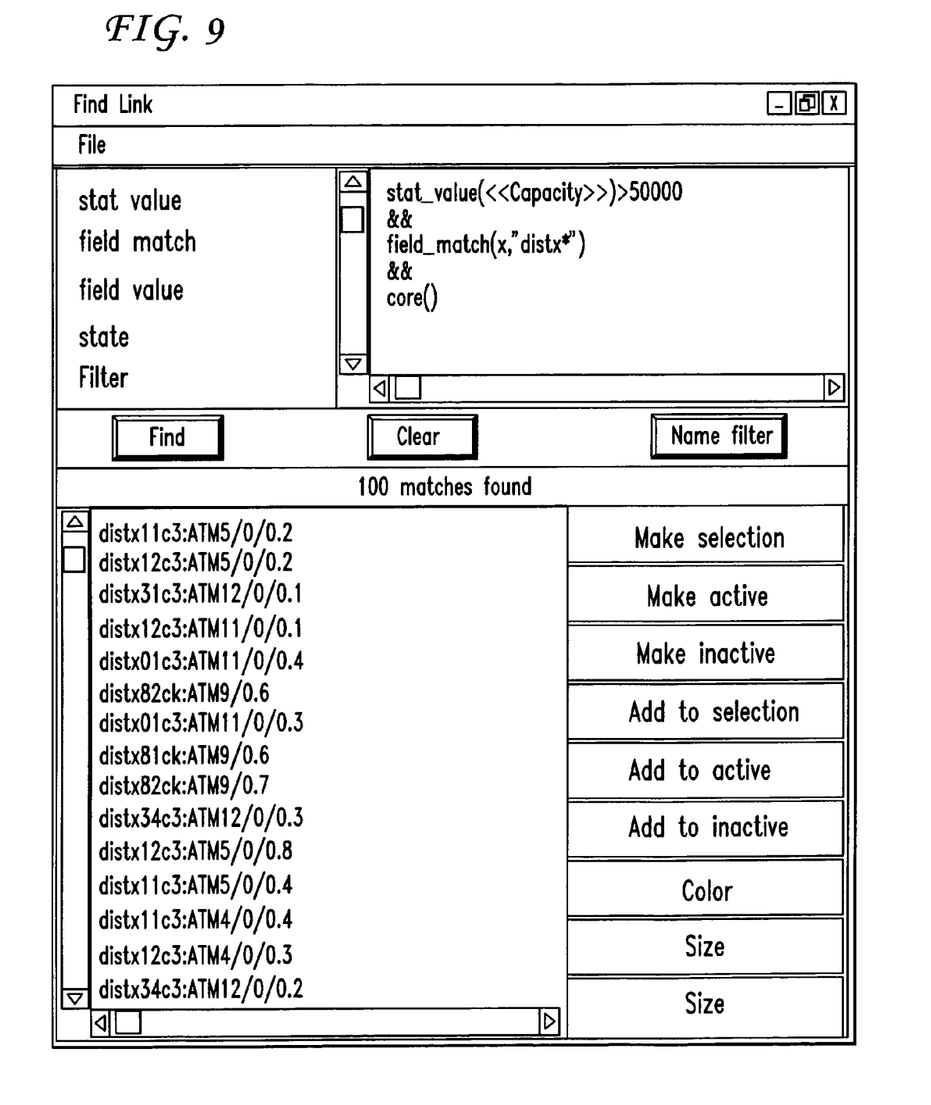

It is advantageous to include some search facility permitting queries on objects, as set forth in FIG. 9. The "Find Link" user interface in FIG. 9 permits arbitrary expression searches involving statistics, object fields, special filters, etc.

Figure 10:
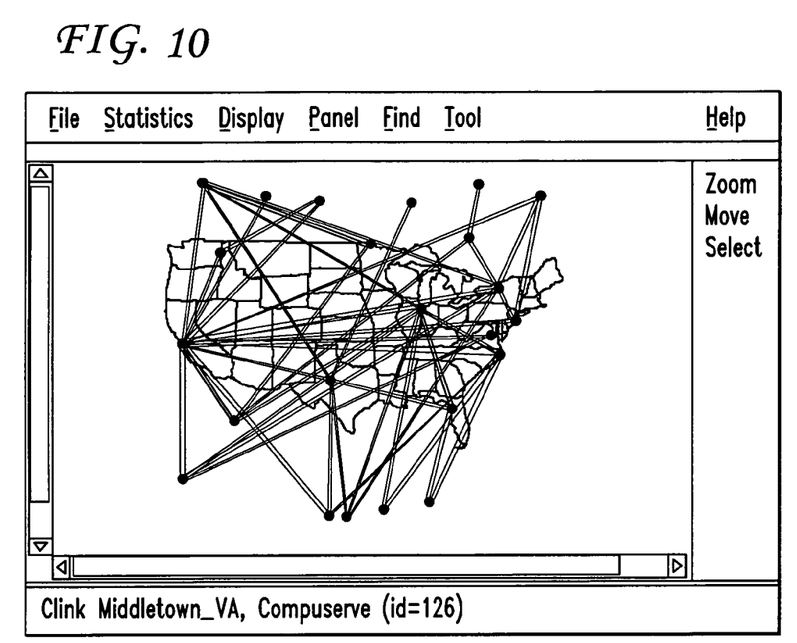
Figure 11:
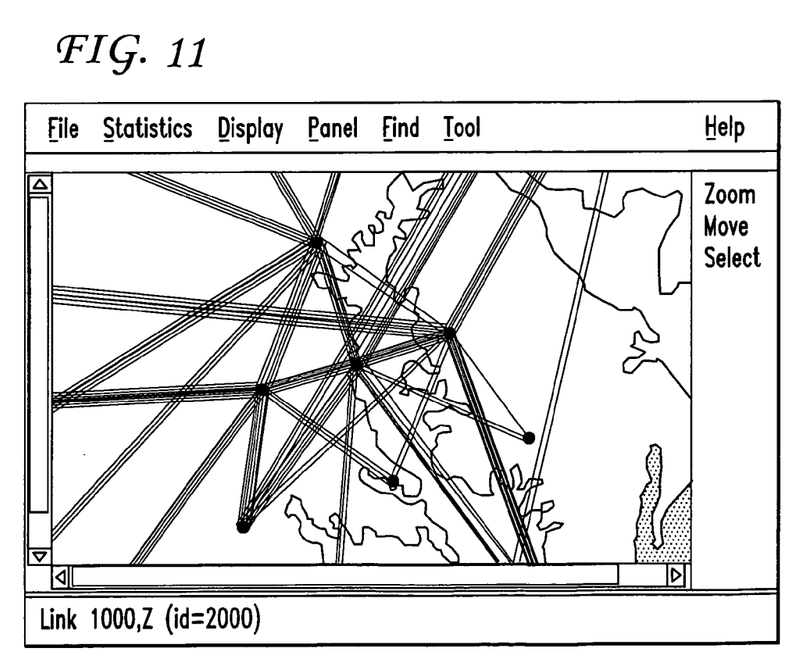

FIGS. 10 and 11 sets forth the basic display of the muter and link data objects graphically superimposed over a map of the relevant geography. Given the large numbers of nodes and links that may need to be displayed, it is helpful to permit the user to choose which sets of objects to display as well as to define different layers of aggregation and abstraction, e.g. combining routers into complexes, aggregating parallel links, etc. The display in FIGS. 10 and 11 has a user interface that recognizes the notion of a current object for each type. An object becomes the current object either when it is selected or when the mouse is moved on top of it graphically. For example, a user whose mouse pointer hovers over a particular link displayed in FIG. 10 would cause the associated Link Panel window and Link Statistics window to change to information regarding that particular link.

It is advantageous for the visualization module to permit changes to the data model "on the fly" such as modifications to an OSPF weight of a link in the network. Then the software can use the routing module to automatically recalculate all mutes for all active traffic demands, and update all relevant statistics that are based upon the traffic including link load and utilization. It is also helpful to maintain at least two different sets of weights, one that can be manipulated and one that can act as an anchor or baseline.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described the present invention in the context of the Internet and IP-based backbone networks. However, the principles of the present invention could be extended to other types of packet-switched networks. Such an extension could be readily implemented by one of ordinary skill in the art given the above disclosure.

What is claimed is:

1. A non-transitory computer readable medium encoded with computer executable instructions for measuring traffic demand in a packet-switched network, the computer executable instructions defining a method comprising:

receiving data representing network traffic in an Internet Service Provider (ISP) backbone destined for a plurality of destination network addresses;

associating each of the destination network addresses with a set of egress links from the ISP backbone; and computing network traffic demand by aggregating network traffic traveling between an ingress link to the ISP backbone and a set of egress links from the ISP back bone.

2. The computer readable medium of claim 1 wherein the data is derived from packet flow measurements in an operational network.

3. The computer readable medium of claim 2 wherein the packet flow measurements are obtained at all ingress links in the packet-switched network.

4. The computer readable medium of claim 2 wherein the packet flow measurements are obtained at peering links in the packet-switched network.

5. The computer readable medium of claim 1 wherein a destination prefix address is associated with each set of egress links.

6. A method of measuring traffic demand in a packet-switched network comprising:

receiving data representing network traffic in an Internet Service Provider (ISP) backbone destined for a plurality of destination network addresses;

associating each of the destination network addresses with a set of egress links from the ISP backbone; and computing network traffic demand by aggregating network traffic traveling between an ingress link to the ISP backbone and a set of egress links from the ISP backbone.

7. The method of claim 6 wherein the data is derived from packet flow measurements in an operational network.

8. The method of claim 7 wherein the packet flow measurements are obtained at all ingress links in the packet-switched network.

9. The method of claim 7 wherein the packet flow measurements are obtained at peering links in the packet switched network.

10. The method of claim 6 wherein a destination prefix address is associated with each set of egress links.

* * * * *